(12) United States Patent
Sundermeier et al.

(10) Patent No.: US 6,415,905 B1
(45) Date of Patent: Jul. 9, 2002

(54) TRANSPORT DEVICE

(75) Inventors: Friedrich Sundermeier, Bad Oeynhausen; Martin Heinz, Porta Westfalica, both of (DE)

(73) Assignee: BRECO Antriebstechnik Breher GmbH & Co. (DE)

( * ) Notice: Subject to any disclaimer, the term of this patent is extended or adjusted under 35 U.S.C. 154(b) by 86 days.

(21) Appl. No.: 09/687,739

(22) Filed: Oct. 16, 2000

(30) Foreign Application Priority Data

Oct. 15, 1999 (DE) .......................................... 199 49 690

(51) Int. Cl.⁷ .............................................. B65G 25/00
(52) U.S. Cl. ................... 198/465.1; 198/465.2
(58) Field of Search ........................... 198/465.1, 465.2, 198/831, 833, 853, 326

(56) References Cited

U.S. PATENT DOCUMENTS 4,974,519 A * 12/1990 Miletto .................... 198/465.2
5,529,168 A * 6/1996 Soriano et al. .......... 198/465.1

* cited by examiner

Primary Examiner—Joseph E. Valenza
Assistant Examiner—Khoi H. Tran
(74) Attorney, Agent, or Firm—Blakely Sokoloff Taylor & Zafman

(57) ABSTRACT

The transport device serves to horizontally convey workpieces and has a plurality of plate elements, which are plug connected onto a vertically aligned tooth belt and are guided by it along an endless path. Each plate element is separately connected to the tooth belt and separately replaceable. The transport device ensures extremely precise positioning of the plate elements at the processing stations for the workpieces in a simple manner.

11 Claims, 3 Drawing Sheets

TRANSPORT DEVICE

1. FIELD OF THE INVENTION

The invention relates to a transport device for horizontally conveying articles including a plurality of plate elements, which may be propelled in the manner of a chain along an endless path in a common horizontal plane and are pivotable with respect to one another in this plane.

Such transport devices are predominantly used for supplying processing machines with workpieces or transporting workpieces from one processing station to another. The precise positioning of the plate elements at the loading and unloading stations plays an important role, particularly when the transport devices operate cyclically.

2. DESCRIPTION OF THE PRIOR ART

Transport devices of the type referred to above are known in practice in which the individual plate elements are jointedly connected together to form a chain. A friction wheel drive serves to move the chain. The chains comprise many individual components and are thus expensive and susceptible to wear.

It has been found that the positional accuracy of the known devices leaves something to be desired. This is due on the one hand to the fact that a friction wheel drive can only be precisely controlled within limits due to the inevitable slippage. An additional factor is that the chain constituted by the plate elements stretches under load whereby a permanent elongation also occurs in the course of time as a result of the inevitable wear in the chain joints.

It is thus the object of the invention to increase the positional accuracy of the transport devices.

SUMMARY OF THE INVENTION

In order to solve this object the transport device of the type referred to above is characterised in accordance with the invention in that the plate elements may be propelled by a common toothed belt which is vertically aligned and is drivable by at least one toothed disc with a vertical axis along the endless path of the plate elements.

A toothed belt is not subject to any permanent elongation, even after a long period of use. This applies above all to toothed belts of plastics material, as are preferably used. Longitudinally extending embedded wire cables ensure the necessary stability. An additional factor is that toothed belts are driven without slippage. As a result, they make extremely precise control possible with correspondingly higher positional accuracy.

The endless path of the plate elements can be of any desired shape. At the turning points there are toothed pulleys on the profiled side of the toothed belt and smooth rollers on the rear side. A plurality of the toothed rollers can be driven depending on the path length and the loading of the transport device. The latter is suitable also for constructing warehouse tracks and backup conveyors.

The plate elements can still be all jointedly connected together or in groups. The force transmission between adjacent plate elements may thus be reduced as desired, preferably even completely eliminated if each plate element is separately propelled by the common toothed belt, i.e. is separately coupled to the toothed belt.

Under these circumstances, articulated connections between the individual plate elements or groups of plate elements need not be omitted. It is, however, particularly advantageous to separate all the plate elements and to provide each plate element with a plug coupling for plug connecting to the toothed belt. This makes the transport device extremely easy to maintain because if damage should occur only the plate elements which are actually damaged can be replaced individually. They are merely pulled away from the toothed belt and new plate elements are then pushed on without difficulty, preferably clipped on. All joint wear is also eliminated. In the case of a chain, the entire chain needs to be disassembled.

Couplings which are of pocket-like construction for engaging around a respective tooth on the toothed belt have proved to be particularly satisfactory. A projection engaging between adjacent teeth is equally possible but such a projection extends into the deformation region of the toothed belt. A gripped tooth, however, is not subject to deformation.

It is advantageous for manufacturing reasons to form the plug couplings integrally on the plate elements. The plate elements preferably consist of plastics material. The material can be freely selected and matched to the prevailing requirements. High-temperature plastics may thus also be used. The large selection of materials which are available results from the fact that no highly loaded articulated connections are necessary between adjacent plate elements. They require certain sliding properties of the materials which play no part or at most only a minor part in the invention.

Depending on the application, the plate elements can be provided on their support surfaces with mountings, preferably with integrally formed mountings, for the articles. The mountings can also engage over a plurality of plate elements. These are adapters which are matched to the shape of the workpieces in question.

Adjacent plate elements can adjoin one another with circular segmental opposing surfaces in order to ensure the necessary mutual pivotability in the common horizontal plane. It has, however, proved to be more advantageous to permit adjacent plate elements to mesh with one another in the manner of tooth segments, whereby the tooth geometry can be matched to the prevailing pattern of movement. The transverse extent of the plate elements can be increased in this manner, even when they are closely spaced in the longitudinal direction of the toothed belt.

The transport device in accordance with the invention is suitable also for conveying those workpieces which have a considerable size and a considerable weight. With increasing weight, however, it is recommended that the plate elements be vertically supported, at least in the load-bearing section of their endless path. In the simplest case, tracks can be provided which extend on both sides of the toothed belt between its turning points. The material of the tracks can be so selected that the necessary sliding properties are provided, even if the plate elements consist of a material with a low sliding ability.

If necessary, it may also be advisable to support the toothed belt vertically, at least in the load-bearing section of the endless path of the plate elements. This applies particularly to the regions of the turning points because vertical support of the plate elements at these points is generally only possible without difficulty on the outside. In the simplest case, one can permit the lower edge of the toothed belt to run over a support track. The possibility is available, above all, to provide the toothed belt and the toothed pulleys with vertical force-transmitting profiles. For instance, the teeth can be arcuately curved. This imparts excellent vertical guiding to the toothed belt and also suppresses the polygon effect which results in very quiet running of the toothed belt. Wedge-shaped tooth systems are equally possible and also straight teeth with a central wedge guide. The latter construction is particularly simple from the manufacturing point of view and also offers the best possibilities for plug connecting or clipping on the plate elements. Furthermore, the toothed pulleys can also be provided with a support rim on which the toothed belt rests with its entire side surface.

The latter feature can preferably be considered also for flat deflecting rollers.

The invention will be described in more detail below with reference to preferred exemplary embodiments in conjunction with the accompanying drawings.

DESCRIPTION OF THE PREFERRED EMBODIMENT

Figure 1:
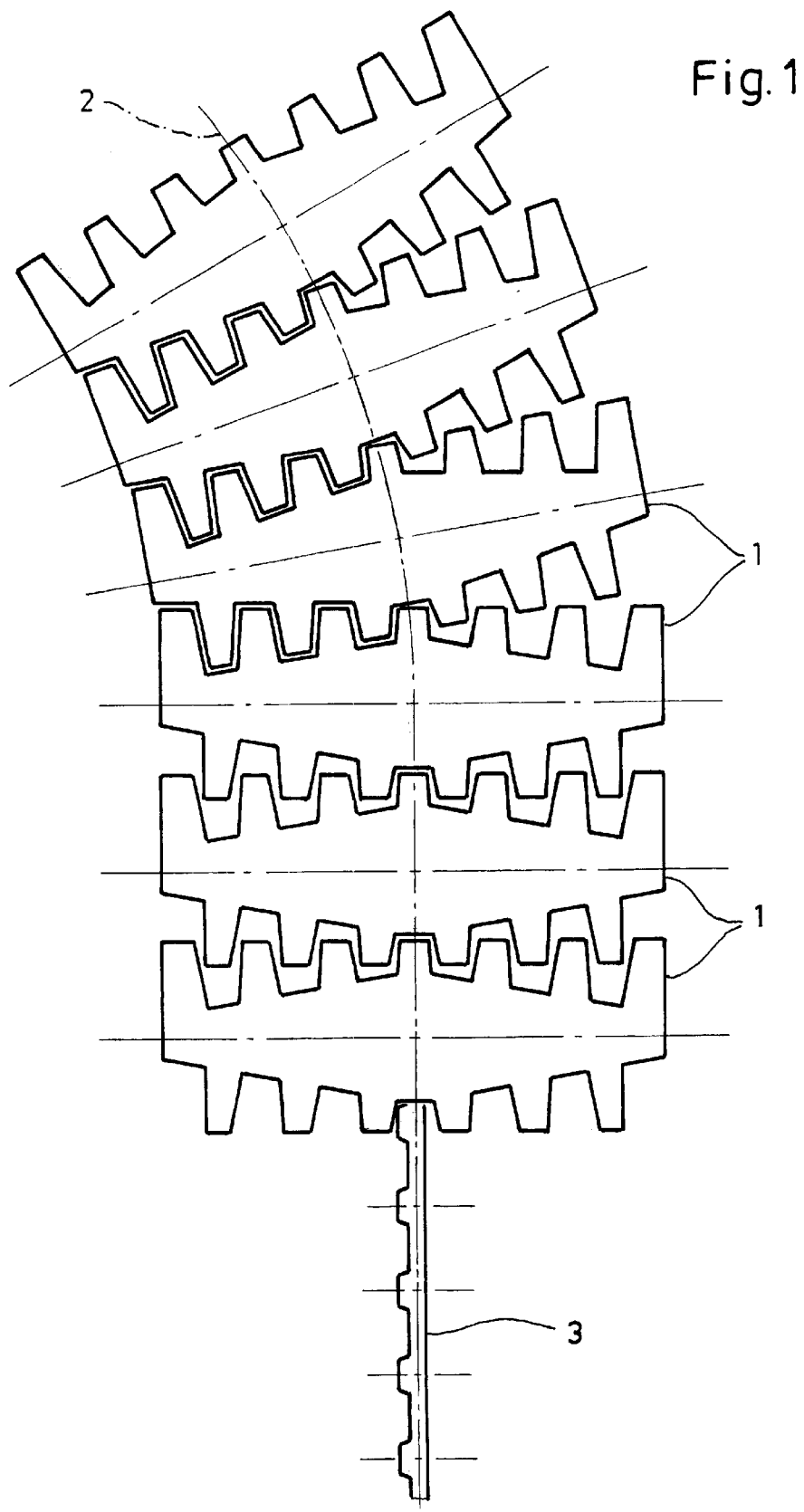
FIG. 1 shows the outline of a section of a transport device in accordance with the invention.

The transport device shown in FIG. 1 is used for horizontally conveying articles, which are not shown. It has a plurality of plate elements 1, which are moved along an endless path 2 in a common horizontal plane, namely in the plane of the drawing. They are driven by means of a toothed belt 3, onto which they are mounted.

Figure 2:
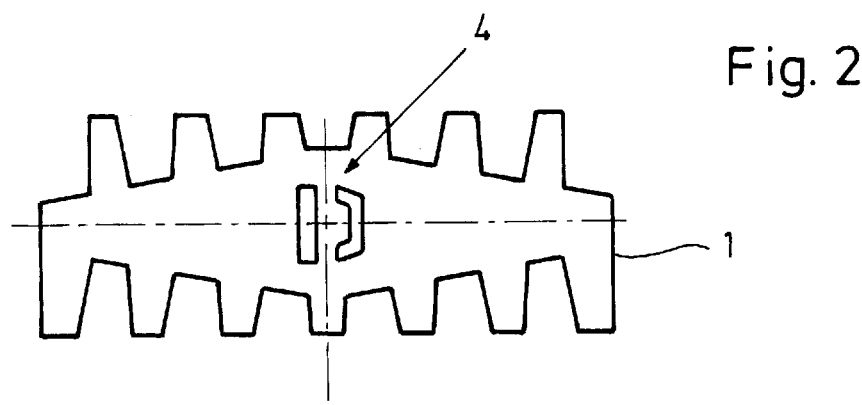
FIG. 2 is an underneath view of a plate element shown in FIG. 1.

The nature of the connection will be apparent from FIG. 2. Each plate element is provided with an integrally moulded plug coupling 4 which is constructed in the manner of a pocket in order to engage around an associated tooth on the toothed belt 3.

Each plate element 1 is separately driven by the toothed belt 3. There is also no connection between adjacent plate elements.

The transport device enables very precise positioning of the plate elements 1 and also offers the possibility of separately replacing the individual plate elements. The construction is simple and economical to manufacture. The material of the preferably injection moulded plate elements 1 can be selected without taking account of possible slipping characteristics since there are no force-transmitting joints between the individual plate elements.

As may be seen, in particular, in FIG. 1, adjacent plate elements 1 engage in the manner of tooth segments into one another and thus render possible the pivotability which is necessary at the turning points.

Figure 3:
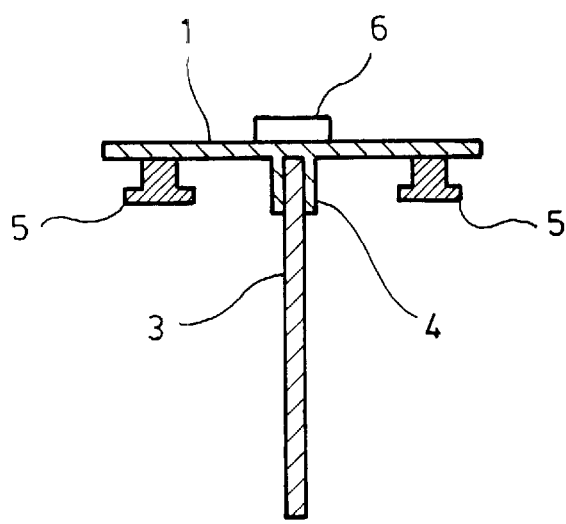
FIG. 3 is a sectional view of the transport device at a first position.

As shown in FIG. 3, the toothed belt 3 is flanked by two rails on which the plate elements 1 are vertically supported in order to relieve the toothed belt of heavier weights. A mounting 6 is also indicated in FIG. 3, the shape of which is matched to the shape of the workpieces to be transported.

Figure 4:
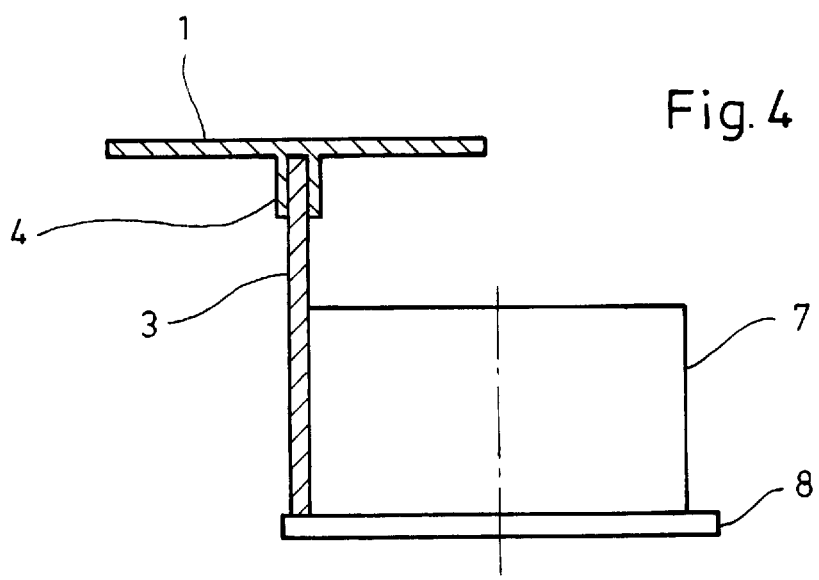
FIG. 4 is a sectional view corresponding to FIG. 3 at a second position.

FIG. 4 shows one possibility for supporting the toothed belt 3 itself, namely at the location of a turning point. The toothed belt 3 is guided at this point by a smooth roller 7 which engages the rear surface of the toothed belt. Its teeth thus point to the left in FIG. 4. The smooth roller 7 is provided with a support rim 8, on which the lower edge of the toothed belt 3 is supported.

A corresponding support rim can also be provided at those turning points at which the toothed belt passes around a driven or freewheeling toothed pulley. Additionally or alternatively thereto, there is the possibility of constructing the profile of the toothed belt and of the toothed pulley so as to transmit force vertically.

Figure 5:
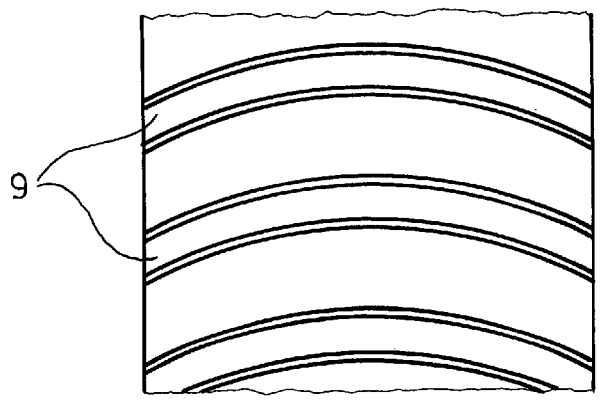
FIG. 5 is a development of a first embodiment of a tooth system.

FIG. 5 shows a development of a first exemplary embodiment of this. The profiling has teeth 9 which are of arcuate shape and ensures a very good lateral guiding, in this case vertical guiding, of the toothed belt on the toothed pulley. The polygon effect is also eliminated.

Figure 6:
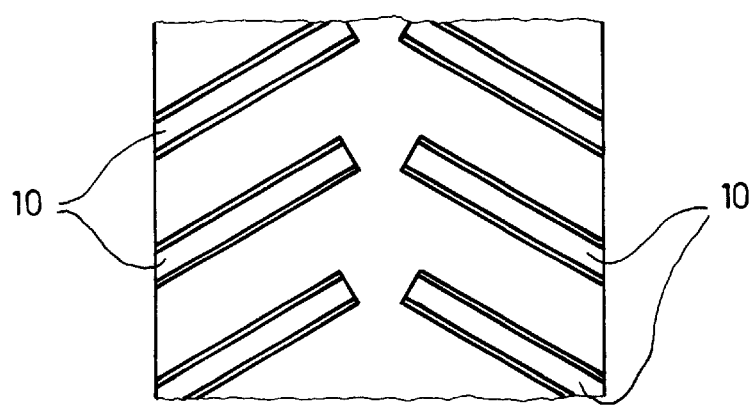
FIG. 6 is a development of a second embodiment of a tooth system.
Figure 7:
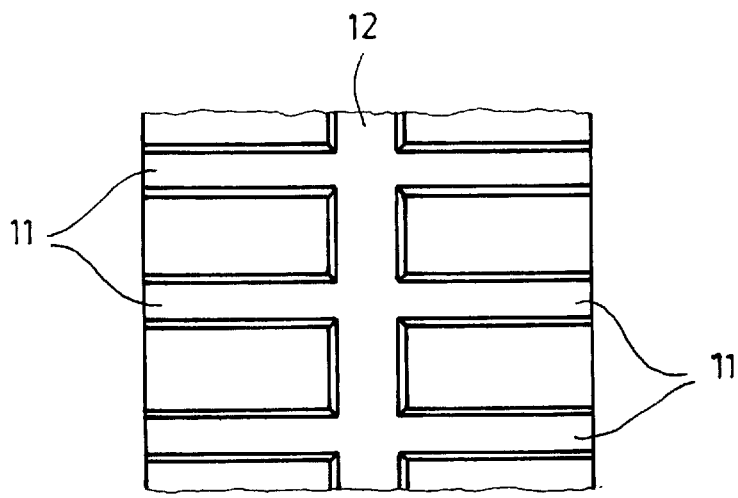
FIG. 7 is a development of a third embodiment of a tooth system.

FIG. 6 shows a development of a profiling with teeth 10, which are aligned in the shape of an arrow and also ensure vertical guiding of the toothed belt on the toothed pulley. The latter applies also to the profiling illustrated in the form of a development in FIG. 7. This shows teeth 11, which are aligned in a straight line transverse to the direction of movement, whereby a central web 12 is provided which engages in a corresponding groove in the opposing profile.

Modifications are of course possible within the scope of the invention. Thus adjacent plate elements can be connected together in the direction of movement, individually or in groups, by means of appropriate joints. The force transmission is, however, minimal so long as the number of those plate elements, which are not directly connected to the toothed belt, remains small. The pivotal meshing of adjacent plate elements need not be in the manner of tooth segments but can also be of arcuate segmental form. In the view of FIG. 1, every second tooth on the tooth belt is occupied by a plate segment. The spacing can be increased, if required, such that no mutual meshing of adjacent plate segments occurs. Instead of the plug couplings, other force-transmitting connections to the tooth belt are possible. If necessary, the plate elements can be laterally guided.

What is claimed is:

1. Transport device for horizontally conveying articles including a plurality of plate elements, which may be propelled in the manner of a chain along an endless path in a common horizontal plane and are pivotable with respect to one another in this plane, whereby the plate elements may be propelled by a common toothed belt which is vertically aligned and is drivable by at least one toothed disc with a vertical axis along the endless path of the plate elements.

2. Transport device as claimed in claim 1, wherein each plate element may be separately propelled by the toothed belt.

3. Transport device as claimed in claim 2, wherein each plate element has a plug coupling for pushing onto the toothed belt.

4. Transport device as claimed in claim 3, wherein the plug couplings are of pocket-like construction for engagement around an associated tooth on the toothed belt.

5. Transport device as claimed in claim 3, wherein the plug couplings are integrally formed on the plate elements.

6. Transport device as claimed in claim 1, wherein the plate elements have support surfaces and are provided on the support surfaces with mountings for the articles.

7. Transport device as claimed in claim 1, wherein adjacent plate elements mesh with one another in the manner of tooth segments.

8. Transport device as claimed in claim 1, wherein the endless path of the plate elements has at least one load-bearing section and wherein the plate elements are vertically supported in at least one of the load-bearing sections of their endless path.

9. Transport device as claimed in claim 1, wherein the endless path of the plate elements has at least one load-bearing section and wherein the toothed belt is supported in at least one of the load-bearing sections of the endless path of the plate elements.

10. Transport device as claimed in claim 9, wherein the toothed belt and the toothed pulleys have vertical force-transmitting profiles.

11. Transport device as claimed in claim 9, wherein the toothed belt is guided by means of at least one flat roller which has a supporting rim for the toothed belt.

* * * * *